C. HILL

Feb. 2, 1932.

Re. 18,348

LISTER PLOW

Original Filed Oct. 3, 1927

2 Sheets-Sheet 1

Charles Hill,
INVENTOR.

Witnesses
C. C. Chuchman Jr.
F. G. Smith

BY Richard B. Owen
ATTORNEYS.

C. HILL

Feb. 2, 1932.

Re. 18,348

LISTER PLOW

2 Sheets-Sheet 2

Original Filed Oct. 3, 1927

Charles Hill,
INVENTOR.

Witnesses
C. E. Cunchman Jr.
F. G. Smith.

BY Richard B. Owen
ATTORNEYS.

Reissued Feb. 2, 1932

Re. 18,348

UNITED STATES PATENT OFFICE

CHARLES HILL, OF SPRINGFIELD, COLORADO

LISTER PLOW

Original No. 1,736,442, dated November 19, 1929, Serial No. 223,820, filed October 3, 1927. Application for reissue filed January 7, 1931. Serial No. 507,285.

This invention relates to improvements in plows and more particularly to an improved construction and arrangement of the mold-boards of a lister plow, although the principles of the invention may find embodiment in subsoilers, drills, and other similar farm machinery.

One of the objects of the invention is to provide an improved rotary mold-board construction for installation upon lister plows, the invention contemplating the provision of novel means whereby mold-boards, which are of the disk type, may be readily angularly adjusted, so as to rotate in different planes at different angles with respect to the share of the lister, such adjustment providing for operation of the lister with maximum efficiency, inasmuch as the angular disposition of the revolving mold-boards may be varied in accordance with the conditions of the soil.

Another object of the invention is to provide a revolving mold-board attachment for listers and the like, embodying means for adjusting the angular disposition of the mold-board, and which adjusting means will be capable of convenient and accurate adjustment without the necessity of dismounting the mold-boards, in order to effect such adjustment.

Another object of the invention is to provide, in combination with the revolving mold-boards, a novel share for attachment to the beam of the lister and so formed as to lift the soil and present the same to the revolving mold-boards in a manner to insure of functioning of the mold-boards with a maximum degree of efficiency.

While the accompanying drawings and the description which is to follow, constitute a disclosure of the preferred embodiment of the invention, it will be understood that various changes may be made within the scope of what is claimed.

Figure 1:
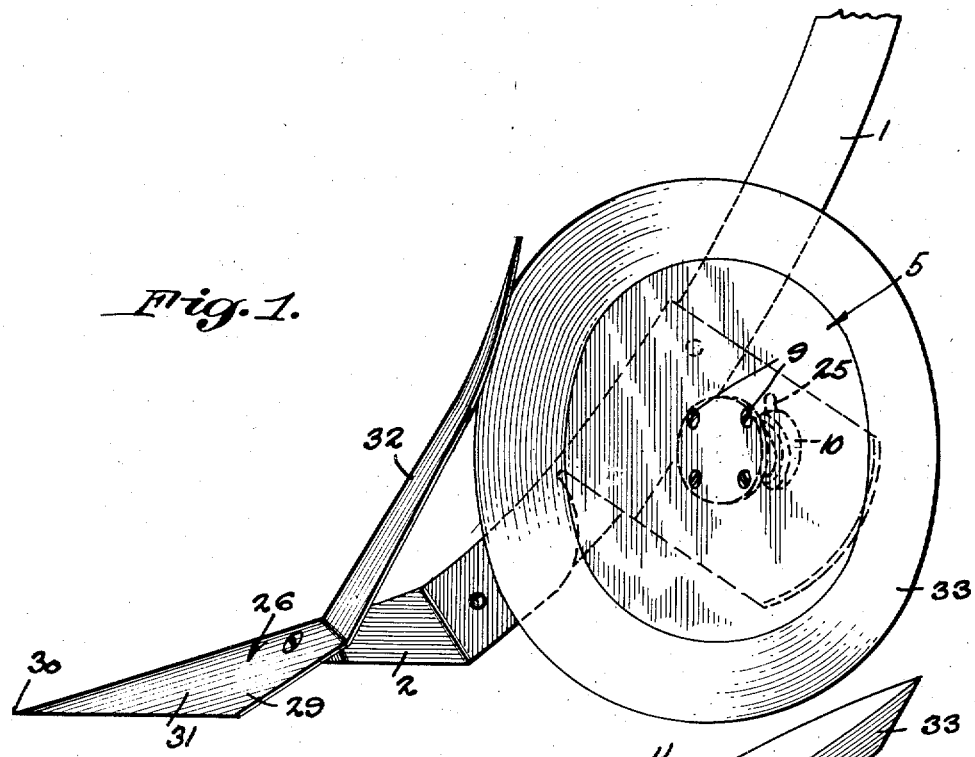
Figure 1 is a side elevation of the structure embodying the invention.

In the drawings, the beam of the lister upon which the mold-boards and the share, embodying the invention, are mounted, is indicated by the numeral 1, and is of the usual construction, the same being provided with the usual forwardly directed and widened end 2 for attachment of the share which will presently be described.

The mold-board structure includes a supporting beam consisting of a channelled body 3 which is disposed to straddle the beam 1 and which is provided, at its opposite sides, with supporting wings 4 which extend downwardly and rearwardly at an angle from the portion 3 and which support the revolving mold-boards, in a manner which will now be explained.

Figure 4:
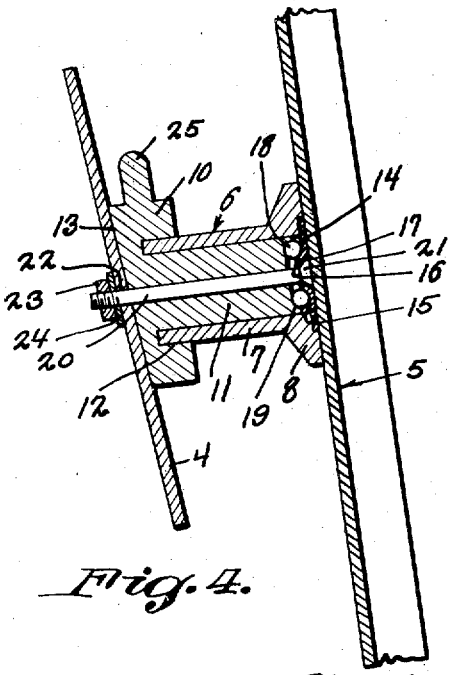
Figure 4 is a vertical sectional view taken substantially on the line 4—4 of Figure 2 looking in the direction indicated by the arrows.

The mold-boards are indicated by the numeral 5 and are of the disk type, and each of the mold-boards is supported upon a respective one of the wings 4 of the supporting member. The supporting means for each mold-board comprises a hub 6 which includes a hollow cylindrical body portion 7 which is formed at one end with a head 8 of circular form and disposed against the inner side of the respective mold-board 5 at the center thereof, the head being secured to the mold-board by means of screws or bolts 9. A bearing head 10 is assembled with the hub 6, being provided, centrally, with a hollow cylindrical neck 11 which is rotatably adjustably fitted in the bore of the cylindrical body of the hub 6, that face of the body 10 which is presented towards the head 8 of the hub 6, being formed with an annular seat 12, surrounding the inner end of the neck 11, and rotatably accommodating the adjacent end of the body 7 of the hub 6. The other face of the head 10, indicated by the numeral 13, is disposed at an angle to the axis of the head and consequently at an angle to the face of the head in which the seat 12 is formed, and this angularly disposed face of the head 10 is arranged in contact with the outer face of the respective supporting wing 4, as clearly shown in Figures 2 and 4 of the drawings. The purpose of the head 10 will presently be described.

In order to provide for free rotation of the hub 6 about the neck 11 of the head 10 and therefore provide for free rotary movement of the disks 5, a bearing disk 14 is disposed against the outer face of the head 8 of the hub 6 and is received flush within a circular recess 15 formed in said face of the head, the disk 14 being clamped against the side of the disk 5 at the time the bolts 9 are tightened. The disk 14 is formed centrally with an opening 16, and the portion of the disk which surrounds this opening is struck out to substantially conical form to provide a ball race indicated by the numeral 17, bearing balls 18 being arranged about this portion of the said disk 14 and within an annular race 19 formed in the end of the neck 11. A bolt 20 is fitted through the bore of the neck 11 and has a beveled head 21 which is received flush within the concave side of the struck-out central portion 17 of the head 14, the head of the bolt being confined between this portion of the disk 14 and that face of the mold-board disk 5 to which the hub 6 is secured. An opening 22 is provided in the supporting wing 4, and the threaded end of the bolt 20 is fitted through the said opening, and a nut 23 is fitted onto the end of the bolt and is adjusted to bear against a washer 24 likewise fitted on the bolt and held against the inner side of the wing 4. In order that the member 10 may be rotatably adjusted, for a purpose which will now be explained, it is provided at a point in its periphery, with an outwardly projecting lug or finger-piece 25 which may be grasped, for rotatably adjusting the head 10, when the nut 23 is slightly loosened.

From the foregoing description of this portion of the structure embodying the invention, it will be evident that the hub 6 of the disk 5, comprising the revolving mold-board, is free to rotate upon the neck 11 of the member 10, so that this neck constitutes in effect, a spindle for the said hub. It will also be evident by reference to Figure 2 of the drawings that, due to the angularly diverging disposition of the wings 4 of the attaching and supporting member 3, the bolts 20, the neck 11 of the head 10, and the cylindrical body 7 of the hub 6 of the mold-board disk 5, are concentrically arranged and extend forwardly and laterally at an angle to the line of draft of the lister, the hubs for the two mold-board disks being oppositely angularly disposed, so that they are relatively arranged on forwardly diverging lines. As it will be desirable to vary the angular disposition of the mold-board disks 5, in accordance with different soil conditions, and in order to render the disks most efficient in view of the conditions encountered, the angular disposition of each disk may be readily varied by slightly loosening the respective nuts 23 and rotatably adjusting the respective head 10 which adjustment, due to the angular disposition of the outer face 13 of the head with respect to the axis of the head, will result in angular adjustment of the axis of the member 10 with respect to the plane of the supporting wing 4. It will be evident that this rotative adjustment of the members 10 may be readily effected, and that a wide range of adjustment of the mold-board disks is obtained.

Figure 2:
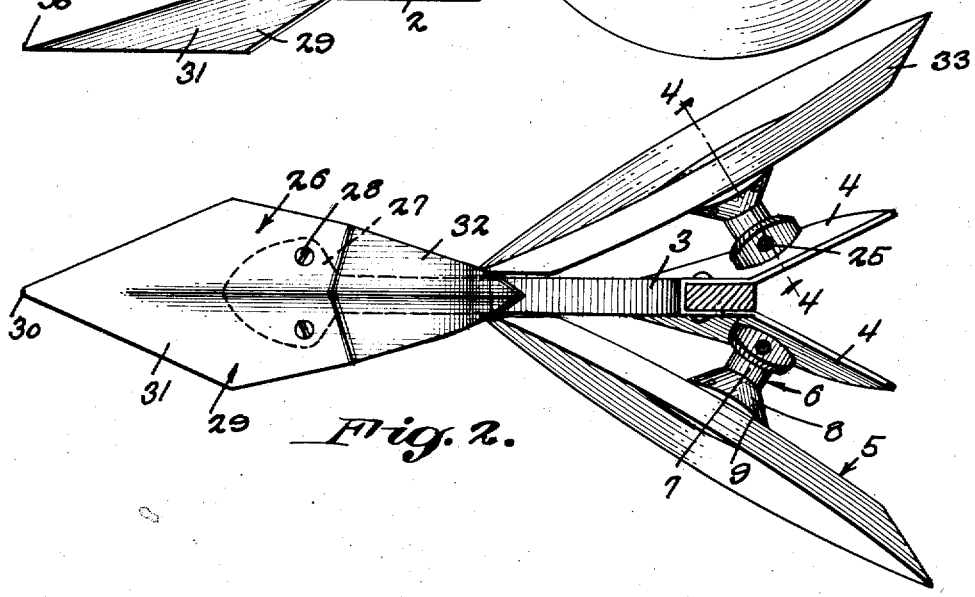
Figure 2 is a top plan view thereof.
Figure 3:
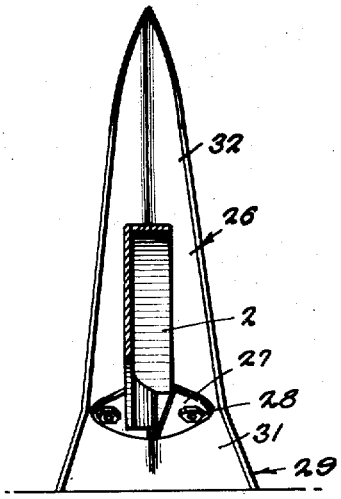
Figure 3 is a vertical section view through the structure shown in Figure 1 taken at a plane in advance of the revolving mold-boards.

In order that the furrows may be opened and the soil directed and elevated in a manner to substantially present it to the mold-board disks and thus provide for most effective action of the disks, a share, of the construction illustrated in Figures 1, 2 and 3 of the drawings, is preferably employed, and in combination with the disks, this share being indicated in general by the numeral 26. The channeled body 3 of the attaching and supporting member of the structure is, of course, to be bolted or otherwise secured to the lister beam 1, and, in order that the share 26 may be supported in proper position in advance of the mold-board disks 5, the forward portion of the said member is flattened to provide an attaching and supporting head 27 to which the share 26 is bolted as indicated by the numeral 28. By reference to Figures 1, 2 and 3 of the drawings it will be observed that the share 26 comprises a blade 29 having a pointed forward end 30 and oppositely downwardly and laterally inclined side portions 31, the blade being secured to the head 27 of the supporting member with its longitudinal center line extending midway between the mold-board disks 5, and consequently in the line of draft of the lister. The rear portion of the blade 29 is extended upwardly, as indicated by the numeral 32, from the point of attachment of the said blade 29 to the head 27 of the supporting member, and this upwardly extended portion 32 of the blade comprising the share, is arranged at a rearward angle of inclination and is tapered in the direction of its upper end, its upper end portion being located immediately in advance of the forward upper sides of the mold-board disks and relatively close thereto.

It will be evident from the foregoing description of the share, that as the same passes through a furrow, the soil at the opposite sides of the furrow will be directed upwardly and rearwardly and therefore, as previously stated, substantially presented to the mold-board disks 5, thus insuring of most effective turning aside of the soil by the disks.

In order that the disks may be substantially self-sharpening and likewise in order to obtain a more thoroughly side-wise delivery of the soil acted upon by the disks, the peripheral portion of each disk is outwardly flared or deflected, continuously throughout its circumference, as indicated by the numeral 33.

During operation, the dirt passes upwardly over the share 26 and the upwardly extending guard plate 32 and is spread laterally to some extent to open up the furrow. The dirt passing backwardly from the sides of the guard plate, 32 strikes the flat central portion of the disk mold-boards 5, the abruptness of the flat faces deflecting the dirt sharply outwardly and lessening the tendency for the dirt to pocket or collect against the disks 5.

As the lister is moved forwardly, the dirt is tumbled, rolled and broken up by its impact with, and its continued passage backwardly over the flat faces of the disks 5, and the dirt is given its final lift and outward throw by impact against the conical flange 33 which presents substantially a succession of flat outwardly inclined surfaces of impact. The rolling and falling of the dirt against these substantially flat surfaces in two different planes at the central and edge portions of the disks 5, rubs and grinds off any prior adhering dirt so that the disk mold-boards are practically self cleaning and prevent the balling up of the dirt.

It is well known from experience that dirt soon begins to build up on a disk of the usual type, and at times accumulates into a sizeable clod or chunk. With the present lister the dirt begins this building up, but after the plow is run a short distance, the continuously raised dirt from the share 26 strikes the adhering dirt on the disks 5 with such force that the prior dirt is dislodged and projected upwardly clear off the disks 5, and absolutely cleans them, particularly where the soil is slightly sandy. This self cleaning action which keeps the face and edge portion of the disk thoroughly bright, is possible not only by reason of the peculiar relationship between the disks 5 and the share 26, but also on account of the peculiar shape of the disks, each presenting in cross section a configuration in two solid planes which are at a distinct angle to each other.

While the angle of the disk 5 to the line of draft may be varied within practical limits, it must be such that the disk 5 takes the dirt from the share 26 and completes the opening of the furrow begun by the share and also piles the dirt from the share up on the ridge.

As illustrative of one practical mounting of the mold-board disks 5 the axes of the same may be disposed at such an angle to the line of draft that the disks 5 converge forwardly and are spaced apart thereat a distance of substantially 2½ inches while the disks 5 diverge rearwardly of their axes and are spaced apart thereat a distance of substantially 17½″.

It is apparent from the construction above described that the angular relation between the disks 5 may be readily adjusted or changed by turning the beveled heads 10 to meet various conditions of use.

The disks are therefore disposed relatively to each other at an angle of substantially 58 degrees, and these disks, serving as mold-boards, receive the dirt as it slides off the share 26 and thrusts the dirt outwardly and upwardly to complete the opening of the furrow begun by the share and forming opposed ridges at opposite sides of the furrow.

The disks, by virtue of the peculiar mounting above described, may be disposed at an angle to the ground, and this angle may be approximately 10 degrees from the vertical although it will be varied according to the work to be done. This angle of the disks with respect to the ground would be materially increased where the plow is used a second time through a furrow after it has once been formed and where there are weeds along the edge of the ridge. The bottoms of the disks 5 would be directed outwardly to trim off the weeds and thoroughly stir up the ground.

While the disks 5 may be of any practical diameter, one embodiment of the invention provides a disk having a central flat or plane portion which is of substantially 10 inches in diameter and which is bounded by a conical outwardly directed flange or rim section 33 which is substantially of a depth of 2½ inches. The cross sectional configuration of this conical flange 33 presents a straight line or transverse surface which extends in a plane at an angle to the plane of the central portion of the disk.

The particular mounting and location of the disks 5 with respect to the share 26 relieves the disks from the complete work of opening the furrow as the disks in the present instance only assist or complete the work of opening the furrow already commenced by the share 26 and thus the edges of the disks receive less strain and wear imposed upon them than where the disks are used for initially opening the furrow. The shooting or thrusting action of the dirt off from the disks has a tendency to work the edges of the disks down or wear them away and this effects a self sharpening of the disks when in use.

Having thus described my invention what I claim as new is:—

1. An adjustable revolving mold-board comprising a supporting member, a mold-board disk, a hub having a cylindrical body portion and a head, means securing the head to the disk, a bearing disk disposed against the face of the first mentioned disk, the head of the hub having a seat in its face which contacts the mold-board disk, the periphery of the bearing disk seating in said seat and the bearing disk having a central opening and a seat in its side which contacts the mold-board disk, a cylindrical member upon which the cylindrical body of the hub is rotatably mounted, the member having a head provided with a face at an angle to the axis of the member and disposed against the support, a bolt having its head seating in the seat in the bearing disk, the last mentioned member having an axial opening therein, the said bolt extending through said opening and through the supporting member, a nut threaded upon the bolt and bearing against the supporting member and maintaining the last mentioned member in positions of rotative adjustment upon the bolt, and anti-friction bearing elements arranged between the bearing disk and the inner end of the tubular body of said member.

2. In a lister plow, a plow share having oppositely disposed opening blades for opening up a furrow and deflecting the raised earth to opposite sides and rearwardly of the share, and a pair of rotary mold-board disks arranged in rearwardly diverging relation following the share, each disk having a flat rotary deflecting surface and a marginal conical portion extending outwardly and presenting a flat surface in a plane at an angle to the first mentioned flat surface, whereby the earth is sharply deflected from all portions of said disks.

3. In a lister plow, a plow share having oppositely disposed opening blades for opening up a furrow and deflecting the raised earth to opposite sides and rearwardly of the share, a pair of rotary mold-board disks arranged in rearwardly diverging relation following the share, each disk having a flat rotary deflecting surface and a marginal conical portion extending outwardly and presenting a flat surface in a plane at an angle to the first mentioned flat surface, whereby the earth is sharply deflected from all portions of said disks, and adjustable supporting means for the disks for holding the same at a desired angle relative to each other and to the plow share and at the desired height and distance relatively to the rear end of the plow share to accommodate the plow to soil of various conditions.

CHARLES HILL.